June 11, 1957     W. R. ELSEY     2,795,387
SUPPORTING MEANS FOR FUSEES AND THE LIKE
Filed March 1, 1954
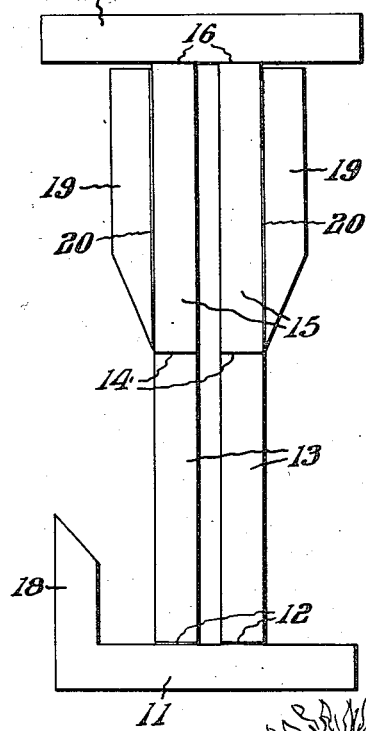
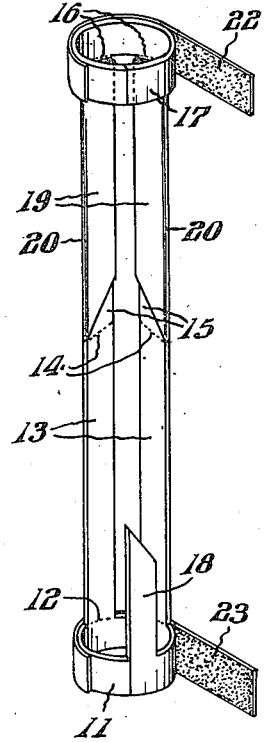
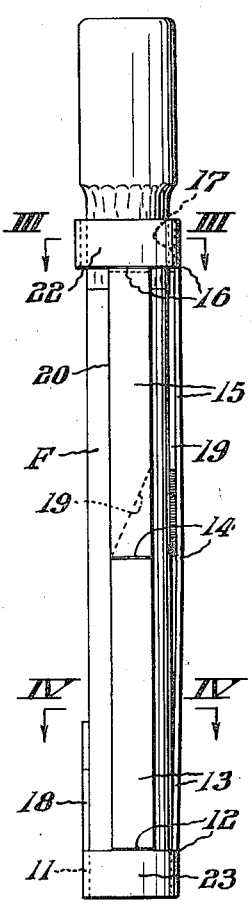
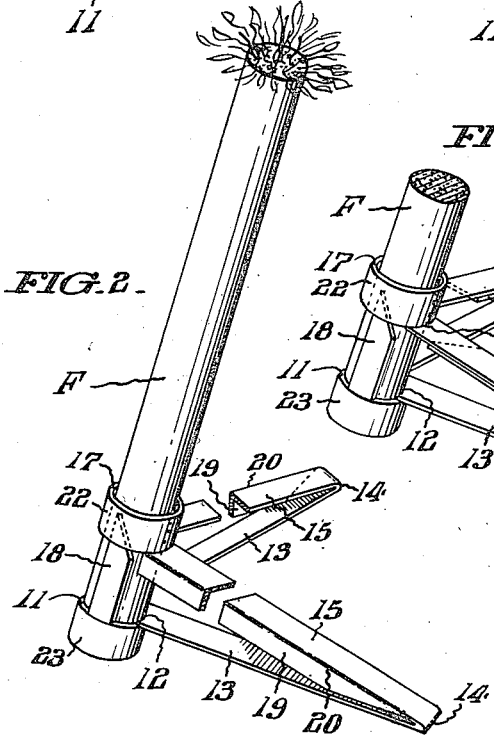
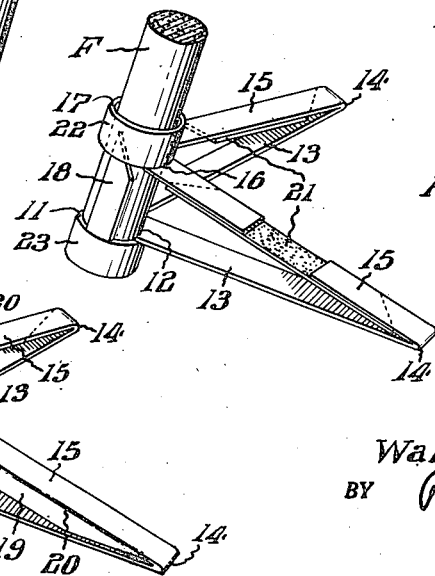
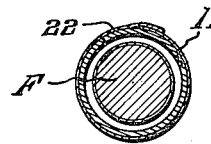
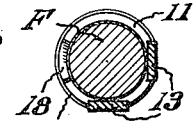
INVENTOR.
Warren R. Elsey,
BY Paul & Paul
ATTORNEYS.

United States Patent Office 2,795,387
Patented June 11, 1957

2,795,387

SUPPORTING MEANS FOR FUSEES AND THE LIKE

Warren R. Elsey, Merion, Pa., assignor of one-half to Paul H. Griffith, Gladwyne, Pa.

Application March 1, 1954, Serial No. 413,342

5 Claims. (Cl. 248—46)

This invention relates to supports for fusees, flares, torches and the like, of the kind used for example to warn motorists of an emergency breakdown of a truck or an automobile parked along the side of a highway in order to prevent oncoming motorists from colliding with the stalled vehicle. Reference is made to my co-pending application No. 352,359 for Supporting Means For Fusees and the Like filed May 1, 1953.

My invention has for its principal object to provide a novel and improved construction of a support for such warning signal. Ordinarily fusees are provided with a spike at one end, which spike is driven into the ground to support the fusee in an upright but non-vertical position. This inclined position is preferred since the fusee will burn much better in this position than in a vertical position. In the inclined position the lava from the burning fusee will drop off and fall to the ground, while if the fusee were held in a vertical position the lava will run down the side of the tube. This method of supporting the fusee by a spike driven into the ground is impossible or impractical in a great number of situations. On a concrete highway, the spike could not be made to penetrate the concrete. Even if such penetration were possible, the practice would be discouraged because of the ever present danger of leaving the spike in the highway after the fusee has burned out creating a traffic hazard by imperiling the tires of motorists using the highway. Due to being fabricated throughout from readily destructible material neither the fusee nor the support of my invention present any hazard to persons or to the tires of passing vehicles.

It is the object of this invention to eliminate the spike from the fusee and to substitute therefor an inexpensive support which is attached to each fusee and is collapsible into a small space about the fusee for economy and facility in packing and shipping; which is of simple, one piece construction with a minimum of elements to accomplish the result desired; which is reinforced at appropriate spots and includes a positive stop means to lock the supporting elements in position to afford a rigid and rugged structure.

Other objects and attendant advantages will appear from the following detailed description of the attached drawings, wherein:

Fig. 1 shows a supporting means embodying my invention collapsed upon the signal device with which it is associated.

Fig. 2 is a perspective view showing the support extended and sustaining the signal device in an upright non-vertical position on a roadbed or other surface.

Fig. 3 is a sectional view along the line III—III of Fig. 1.

Fig. 4 is a sectional view along the line IV—IV of Fig. 1.

Fig. 5 shows a supporting means embodying my invention before it is rolled and affixed to the signal device.

Fig. 6 illustrates the construction and manner in which the supporting means is attached to the signal device.

Fig. 7 is a fragmentary view in perspective of an alternative form of my invention.

Referring to the drawings, the supporting means includes a collar 11 which is securely fastened to the bottom of the fusee F. Extending from the collar 11 are two legs 13 hingedly connected to the collar 11 at 12. The support means is preferably formed in one piece as shown in Fig. 5 cut or stamped from suitably stiff strip material such as cardboard or the like. The reference character 12 is used to mark the transversely scored connection between the legs 13 and the collar 11 about which the legs 13 are hingedly movable. Connected to the other end of each leg 13 at transversely scored line 14 is a corresponding brace 15. Each brace 15 is hingedly connected at 16 to the top collar 17 which is slidably mounted about the fusee F.

Attached to the fixed collar 11 and extending upward parallel to the axis of the fusee F is the stop wedge tab or tongue 18. When the support is extended as in Fig. 2 with collar 17 moved down toward collar 11, the pointed top end of the stop wedge tab or tongue 18 frictionally engages between the movable collar 17 and the fusee F so as to fix the collar 17 in that position and make the support rigid.

Each brace element 15 has a flap or flange 19 extending along its transversely scored edge 20. These flaps 19 are doubled under the braces 15 (Figs. 1 and 6) when the support is collapsed upon the fusee. When the support is set up to sustain the fusee, the flaps 19 assume a position 90° from the plane of the braces 15 to reinforce the braces against buckling (Fig. 2).

Fig. 6 illustrates how the collars 11 and 17 are formed and held together by means of gummed strips 22 and 23 respectively of paper or other suitable material.

Fig. 7 shows a modification of the device in that flaps 19 are replaced by reinforcing elements 21 which are affixed to the braces 15 in any convenient manner as by gluing or stapling, etc.

It will be noticed that this invention achieves a stable supporting tripod by making use of the object to be supported, F, as one leg thereof, thus permitting the use of an absolute minimum of supporting legs, two. Each fusee is provided with its individual support of which the collar 11 is permanently attached so as to eliminate any chance of the support becoming separated from the fusee and unavailable at the time when it is proposed to use the fusee as a danger signal. The simplicity of construction of the support makes it inexpensive to manufacture and permits the support to be discarded with the expended fusee.

The representative embodiments described in detail above are intended merely to be illustrative and not restrictive of the invention. Obviously, they are susceptible of numerous changes in form and detail within the scope of the appended claims.

Having thus described my invention, I claim:

1. A collapsible support for an elongated fusee, said support being formed from stiff cardboard-like material, said support comprising at least two elongated strap members each including a leg portion and a brace portion, each leg portion being connected at one end to said fusee near an end thereof, a first hinge formed in each of said leg portions by a transverse score line adjacent said fusee, each of said brace portions being connected to the other end of said leg portions, a second hinge formed by a transverse score line located between said leg and brace portions, a collar slidably engaged about said fusee and connected to said brace portions, and a third hinge formed by a transverse crease line located between said collar and brace portions, whereby said collar is movable along the body of said fusee towards said first hinge to swing the leg and brace portions radially outwardly so that the leg portions serve, in conjunction with the bottom ends of the fusee, as a base to sustain the fusee in a position inclined to the vertical.

2. The collapsible support defined in claim 1, wherein there is provided a second collar fixedly secured to said fusee and to which are connected said leg portions adjacent said first hinge.

3. The collapsible support defined in claim 1, wherein said support is formed from a single sheet of stiff cardboard-like material.

4. A collapsible support for an elongated fusee or the like, comprising a collar fastened about the fusee, a plurality of legs hingedly connected to the fastened collar, a brace member hingedly connected to each of said legs, a movable collar slidably engaged about the fusee and hingedly connected to said brace members, whereby said movable collar is movable along the body of the fusee away from said fastened collar to substantially flatten the legs and braces along the surface of the fusee, and whereby said movable collar may be positioned intermediate of the last said position and the position of the fastened collar to form a support for a fusee to maintain the fusee in an upright, non-vertical position, and stop means comprising a continuous narrow tab extending along the surface of the fusee from the fastened collar to a location spaced from said fastened collar, the distal end of said tab being wedge shaped and adapted to engage beneath and thereafter frictionally hold the movable collar against displacement.

5. A collapsible support for a fusee and the like as defined in claim 4, said brace member being provided with reinforcing means comprising a flange extending along one side and hingedly connected thereto permitting the flange to lie substantially parallel to said brace member when said brace member is disposed along the surface of the fusee and movable to a position at substantially right angles to the brace member to lend support thereto when the support is extended.

References Cited in the file of this patent

UNITED STATES PATENTS

| | | |
|---|---|---|
| 462,596 | Shephard | Nov. 13, 1891 |
| 871,465 | Whipperman | Nov. 19, 1907 |
| 1,110,142 | Piner | Sept. 8, 1914 |
| 2,095,490 | Decker | Oct. 12, 1937 |
| 2,172,583 | Humphrey | Sept. 12, 1939 |
| 2,454,877 | Lewis | Nov. 30, 1948 |
| 2,511,200 | Freeman | June 13, 1950 |